(12) United States Patent
Dreier

(10) Patent No.: US 8,516,709 B2
(45) Date of Patent: Aug. 27, 2013

(54) APPARATUS FOR TESTING THE ACCURACY OF MACHINE TOOLS AND MEASURING DEVICES

(75) Inventor: Horst Dreier, Horb am Neckar (DE)

(73) Assignee: Dreier Lasermesstechnik GmbH, Horb (DE)

( * ) Notice: Subject to any disclaimer, the term of this patent is extended or adjusted under 35 U.S.C. 154(b) by 323 days.

(21) Appl. No.: 12/900,006

(22) Filed: Oct. 7, 2010

(65) Prior Publication Data

US 2012/0066922 A1 Mar. 22, 2012

Related U.S. Application Data

(60) Provisional application No. 61/250,027, filed on Oct. 9, 2009.

(30) Foreign Application Priority Data

Oct. 9, 2009 (DE) .......................... 10 2009 045 515

(51) Int. Cl.
*G01C 1/00* (2006.01)

(52) U.S. Cl.
USPC .............................................. 33/502; 33/503

(58) Field of Classification Search
USPC ........................................... 33/502, 503, 567
See application file for complete search history.

(56) References Cited

U.S. PATENT DOCUMENTS

| | | | | |
|---|---|---|---|---|
| 4,819,339 A * | 4/1989 | Kunzmann et al. | ............. | 33/503 |
| 4,831,741 A * | 5/1989 | Sogoian | ........................... | 33/502 |
| 5,983,512 A | 11/1999 | Trapet | | |
| 6,408,526 B1 * | 6/2002 | Montesanti et al. | ........... | 33/1 M |
| 6,493,956 B1 * | 12/2002 | Matsuda | ........................... | 33/502 |
| 6,493,957 B1 * | 12/2002 | Takatsuji et al. | ................ | 33/502 |
| 6,513,253 B2 * | 2/2003 | Matsuda et al. | ................. | 33/502 |
| 6,764,272 B1 * | 7/2004 | Nuxoll et al. | .................... | 33/573 |
| 6,782,730 B2 * | 8/2004 | Asanuma | ........................ | 73/1.79 |
| 6,833,163 B1 * | 12/2004 | Krenkel et al. | ................ | 427/380 |
| 7,557,936 B2 * | 7/2009 | Dickinson | ...................... | 356/620 |
| 7,707,739 B2 * | 5/2010 | Holzapfel et al. | ............... | 33/706 |
| 7,788,818 B1 * | 9/2010 | Tran et al. | ........................ | 33/502 |
| 7,908,756 B2 * | 3/2011 | Clifford | ........................... | 33/502 |
| 8,234,793 B2 * | 8/2012 | Weidmann et al. | ............. | 33/707 |
| 8,240,058 B1 * | 8/2012 | Yu et al. | ........................... | 33/613 |
| 2001/0022034 A1 * | 9/2001 | Krenkel et al. | ................... | 33/702 |
| 2001/0045021 A1 * | 11/2001 | Matsuda et al. | ................. | 33/502 |
| 2007/0137059 A1 * | 6/2007 | Holzapfel et al. | .............. | 33/706 |
| 2009/0094847 A1 * | 4/2009 | Clifford | ........................... | 33/502 |
| 2009/0277030 A1 * | 11/2009 | Zhang | .............................. | 33/533 |
| 2010/0007895 A1 * | 1/2010 | Yamagata et al. | ............. | 356/511 |
| 2012/0066922 A1 * | 3/2012 | Dreier | .............................. | 33/502 |

FOREIGN PATENT DOCUMENTS

| | | |
|---|---|---|
| DE | 30 24 560 | 1/1982 |
| DE | 195 07 805 | 9/1996 |
| DE | 196 11 617 | 9/1997 |
| DE | 298 22 001 | 5/1999 |
| DE | 200 00 469 U1 | 4/2000 |
| DE | 202005005574 | 12/2005 |
| DE | 102006014509 | 9/2007 |
| EP | 1 189 020 | 3/2002 |

OTHER PUBLICATIONS

Anonymous: "Zustand einer CNC-Werkzeugmaschine nahe einem Crash schnell überprüfen" [Online]; Aug. 4, 2003.

* cited by examiner

*Primary Examiner* — Yaritza Guadalupe-McCall
(74) *Attorney, Agent, or Firm* — Henry M Feiereisen LLC

(57) ABSTRACT

An apparatus for testing the accuracy of machine tools and measuring devices has a support and at least one reference element formed as a sleeve, wherein the reference element is glued on top of the support.

7 Claims, 1 Drawing Sheet

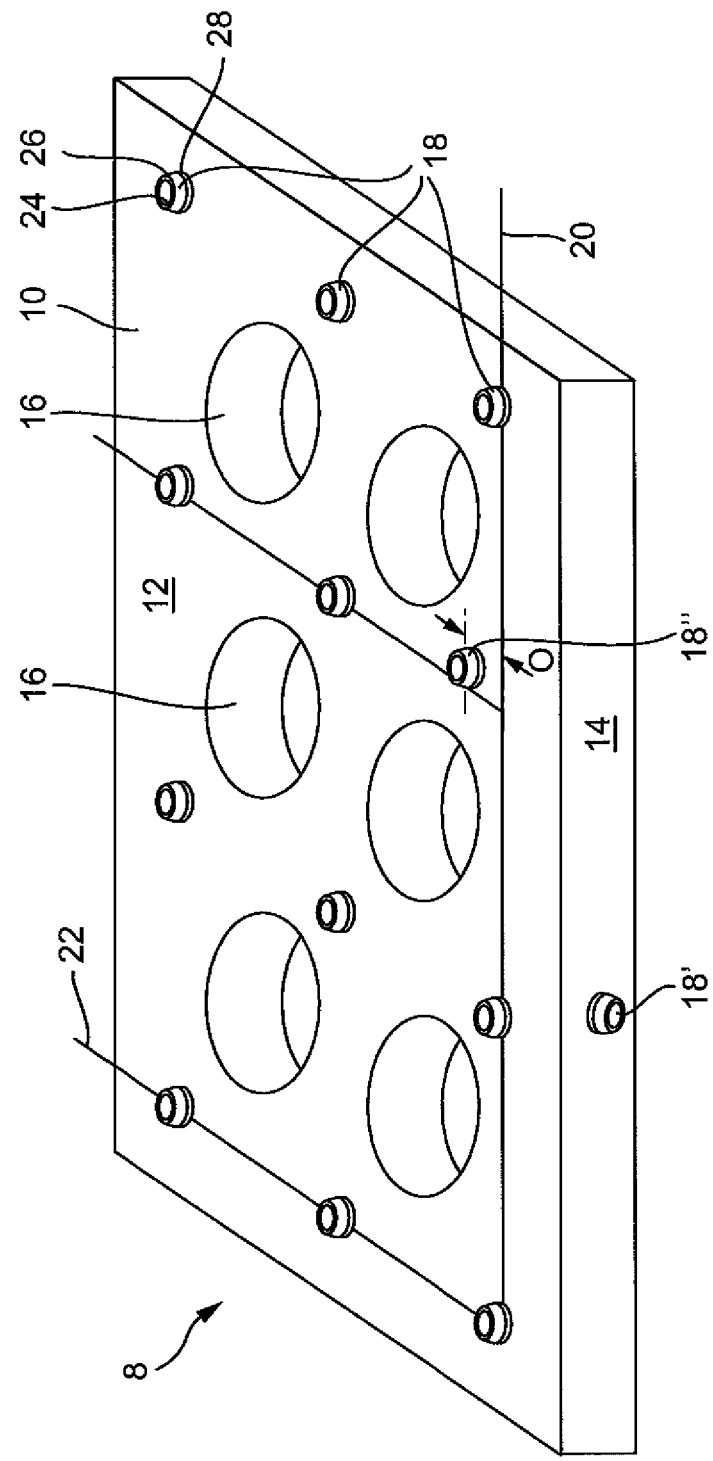

APPARATUS FOR TESTING THE ACCURACY OF MACHINE TOOLS AND MEASURING DEVICES

CROSS-REFERENCES TO RELATED APPLICATIONS

This application claims the priority of German Patent Application, Serial No. 10 2009 045 515.9, filed Oct. 9, 2009, pursuant to 35 U.S.C. 119(a)-(d), the content of which is incorporated herein by reference in its entirety as if fully set forth herein.

This application claims the benefit of prior filed U.S. provisional Application No. 61/250,027, filed Oct. 9, 2009, pursuant to 35 U.S.C. 119(e), the content of which is incorporated herein in its entirety.

BACKGROUND OF THE INVENTION

The present invention relates to an apparatus for testing for accuracy of machine tools and measuring devices, with a support and at least one reference element.

The following discussion of related art is provided to assist the reader in understanding the advantages of the invention, and is not to be construed as an admission that this related art is prior art to this invention.

In an apparatus available from the company Dreier Lasermesstechnik GmbH, Horb am Neckar, with the designation "Quickmaster", for testing the accuracy of machine tools and measuring devices, in particular for testing the accuracy of the travel paths and positioning of tools and scanning means, a stone cuboid with several precisely positioned bores is employed. These bores are provided with sleeve-shaped inserts, in particular collar bushings, which are glued into the bores. After being glued, these bushings, in particular their interior surface, are ground with a high precision coordinate grinding machine and brought to a desired dimension. Which such a test apparatus, information can be provided within a short time and quickly about the state of a CNC machine tool, in particular about the accuracy and the zero point setting of the machine. This is particularly important for the manufacture of high-precision parts, when brief tests must be regularly performed on the machine tool, or when after a machine crash the accuracy of the machine must be checked. It is particularly important to know after a machine crash if the machine has changed with respect to geometry and positioning. With the known device, information about the state of the machine can be obtained within a short time and quickly. This saves service costs, reduces machine and production downtimes and production costs; moreover, insurance premiums need not be paid, because less insurance payouts are needed. With the conventional test apparatus, the flatness, parallelism and angular accuracy can be measured, with tolerances in a range of 2 μm.

It has been observed that the conventional test apparatus is temperature-sensitive and that cracks are formed in the support in the event of greater temperature variations. These cracks are created because the glued bushings have expanded more during heating than the support surrounding the bushings in which the bushings are glued. This may happen, for example, because such test apparatus is placed in a car and is not adequately protected from heat caused by incident solar radiation. As an additional disadvantage, the manufacturing expense of such test apparatus is relatively high, because first highly precise bores must be introduced in the support, in which the bushings are then glued, whereafter the bushings have to be micro-polished.

It would therefore be desirable and advantageous to address this problem and to obviate other prior art shortcomings by to providing a test apparatus which is less sensitive to temperature and which can be produced at lower cost and more quickly.

SUMMARY OF THE INVENTION

According to one aspect of the present invention, an apparatus for testing an accuracy of machine tools and measuring devices includes a support, and at least one reference element glued on top of the support.

By gluing the reference element(s) on top of the support, the essential advantage is attained that no receiving bores for the reference elements need to be drilled in the support, thus saving machining time. In addition, the reference elements can be more easily glued on top of the support than inserted into a previously prepared bore. As another advantage, the test apparatus according to the invention is significantly less sensitive against temperature variations than the conventional apparatus, because the support and the reference element are not nested with a tight pass fit, but only abut each other, thus allowing differences in the expansion at different temperatures without damaging the components. As another advantage, the reference elements can be produced in large quantities and with the required precision and can be attached later on top of the support without requiring post-processing. In the conventional apparatus, each reference element must be micro-polished after being glued into the receiving bore disposed in the support. In addition, a large number of supports can be produced and the reference elements can be attached commensurate with customer specifications at very different positions on the support, even on different planes and surfaces. In addition, the number of the reference elements attached on the support can be adapted to customer specifications. The test apparatus according to the invention can hence be produced within a very short time individually and is significantly more robust.

Advantageously, the support may be constructed as a rectangular plate or a cuboid; however, circular disks or other geometries are also a possibility.

Advantageously, the support may be made of stone, in particular granite, such as African granite, which is relatively insensitive to temperature variations and can be manufactured with high precision.

Advantageously, the reference element may be made of metal, in particular titanium or a titanium alloy. Titanium and titanium alloys have advantageously a thermal expansion coefficient which is identical or almost identical to that of granite. Moreover, titanium and titanium alloys can be machined easily, quickly and with high precision.

In another embodiment, the reference element may be constructed as a sleeve, a sphere, a cuboid or a semi-sphere. These simple geometric shapes can be optimally produced and scanned.

According to another exemplary embodiment, the reference element may have a circular cylindrical interior surface. In addition, the reference element may have an exterior surface segment in form of a truncated cone and/or a circular cylinder. The outside diameter of the reference element may taper down with increasing distance from the support. The reference element glued on top of the support therefore has not only a single reference surface, namely the interior surface as in the state-of-the-art, but has also an exterior surface serving as a reference. This exterior surface need not be parallel to the interior surface, so that angles can also be measured.

Advantageously, the end of the reference element with the larger outside diameter may be glued on top of the support. This provides a large adhesive surface and as a result a high immunity against positional changes of the reference element relative to the support.

According to another exemplary embodiment of the invention, several reference elements may be provided which may be arranged at different distances from imaginary longitudinal and/or transverse lines or grid lines on the support. Because positional dimensions are not exactly maintained, positioning is advantageously not only simplified, but errors in the electronics and/or the CNC control of the machine tool can also be more easily determined. The reference elements may be arranged with a predetermined offset from each other. To determine the exact position of the reference elements, their position is determined and recorded on a gauging machine. The measurement reports can be used as a calibration certificate.

According to another exemplary embodiment, a bonding agent may be used for gluing the reference elements on top of the support, wherein the bonding agent has a thermal expansion coefficient that corresponds to the thermal expansion coefficient of the support and/or of the reference element. Differences in the expansion at different temperatures are thereby reduced to a minimum. The bonding agent, however, may have sufficient elasticity so as to absorb the differences in expansion and securely hold the reference elements on the support.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a perspective view of the exemplary embodiment of the test apparatus.

DETAILED DESCRIPTION OF PREFERRED EMBODIMENTS

These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a perspective view of the exemplary embodiment of the test apparatus 8 according to the invention. The reference symbol 10 designates a support made of granite, in particular African granite, which has a rectangular shape and is constructed as a plate. The top side 12 opposite the bottom side is placed on an (unillustrated) machine bed of a machine tool or is placed in relation to a gauging device. Of course, the support 10 may also be placed on one of its lateral surfaces 14.

The support 10 is permeated with bores 16 to reduce the weight of the carrier. A total of twelve reference elements 18 are glued on the top side 12 of the support 10 using a bonding agent. An additional reference elements 18' is glued on a side surface of the support 10 The reference symbols 20 and 22 designate a longitudinal line and a transverse line of a grid pattern, wherein the reference element 18 arranged in the longitudinal line 20 and in the transverse line 22 may not be exactly positioned on these lines 20 and 22, but have a slight offset 0 from these lines, as schematically indicated for the reference elements 18". In this way, errors in the electronics and in the CNC control, for example rounding errors, summation errors and the like can be determined, because other x- and y-values must be determined for their position.

In the illustrated exemplary embodiment, the reference elements 18 are constructed identically; however, reference elements having different shapes and/or different sizes can be attached on the support 10. Each reference element 18 is configured as a sleeve and has an interior surface 24 in the form of a circular cylinder. The outside is formed by an exterior surface segment 26 in form of a truncated cone and an exterior surface segment 28 in form of a circular cylinder. The exterior surface segment 28 in form of a circular cylinder abuts the top side 12 of the support, and the exterior surface segment 26 in form of a truncated cone tapers down with increasing distance from the top side 12.

The reference elements 18 can be glued to the support 10 in different numbers and at arbitrary positions. Reference elements 18 can also be glued to one or several of the lateral surfaces 14.

Such an apparatus 8 can be provided within a very short time to customer specifications, because the support 10 as well as the reference elements 18 can be prepared in any number. Because the support 10 and the reference elements 18 are not nested, there is no risk of damage to the support 10 or the reference elements 18 by different thermal expansions.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An apparatus for testing an accuracy of machine tools and measuring devices, comprising
   a support made of granite, and
   a plurality of reference elements made of titanium or a titanium alloy having a thermal expansion coefficient matching a thermal expansion coefficient of the granite, wherein the reference elements are glued on a top of the support and onto at least one side surface of the support and have an interior surface in form of a circular cylinder or an interior surface with a polygon-shaped cross-section,
   wherein a subset of the reference elements is arranged on imaginary longitudinal lines or transverse lines, or both, which form a grid pattern on at least the top of the support, and wherein at least one of the reference elements disposed on the top of the support is arranged with an offset from the grid pattern formed by the at least one imaginary longitudinal and transverse line.

2. The apparatus of claim 1, wherein the support is constructed as a rectangular plate or a cuboid.

3. The apparatus of claim 1, wherein the at least one reference element is constructed as a sleeve, a sphere, a cuboid, or a semi-sphere.

4. The apparatus of claim 1, wherein the reference element has an exterior surface segment in form of at least one of a truncated cone and a circular cylinder.

5. The apparatus of claim 1, wherein the reference element has an exterior surface segment in form of a truncated cone, wherein an end of the truncated cone having a larger diameter is glued to the holder.

6. The apparatus of claim 1, wherein the reference elements are glued to the support with a bonding agent having a longitudinal expansion coefficient that corresponds to a longitudinal expansion coefficient of the support or of the at least one reference element.

7. The apparatus of claim 1, wherein the support has openings and at least one of the plurality of reference elements is arranged between openings.

* * * * *